United States Patent
Bourdeaut et al.

(10) Patent No.: US 8,340,012 B2
(45) Date of Patent: Dec. 25, 2012

(54) DEVICE AND METHOD FOR CONTROLLING USER EQUIPMENT ACCESS TO SERVICES OF THE MBMS TYPE OFFERED BY A MOBILE NETWORK

(75) Inventors: Stanislas Bourdeaut, Paris (FR); Yann Sehedic, Vanves (FR)

(73) Assignee: Alcatel Lucent, Paris (FR)

( * ) Notice: Subject to any disclaimer, the term of this patent is extended or adjusted under 35 U.S.C. 154(b) by 781 days.

(21) Appl. No.: 12/278,090

(22) PCT Filed: Jan. 31, 2007

(86) PCT No.: PCT/FR2007/050717
§ 371 (c)(1), (2), (4) Date: Oct. 28, 2008

(87) PCT Pub. No.: WO2007/088311
PCT Pub. Date: Aug. 9, 2007

(65) Prior Publication Data
US 2009/0303912 A1   Dec. 10, 2009

(51) Int. Cl.
*H04J 3/24* (2006.01)
(52) U.S. Cl. .................... 370/312; 370/390
(58) Field of Classification Search ............ 370/312
See application file for complete search history.

(56) References Cited

U.S. PATENT DOCUMENTS

| | | | |
|---|---|---|---|
| 2005/0118992 A1* | 6/2005 | Jeong et al. | 455/422.1 |
| 2005/0249141 A1 | 11/2005 | Lee | |
| 2005/0271007 A1* | 12/2005 | Hwang et al. | 370/329 |

FOREIGN PATENT DOCUMENTS

| | | |
|---|---|---|
| EP | 1594254 A1 | 11/2005 |
| WO | 2005015776 A1 | 2/2005 |
| WO | 2005067180 A1 | 7/2005 |

OTHER PUBLICATIONS

"Universal Mobile Telecommunications System (UMTS)" ETSI Standards, European Telecommunications Standards Institute, Sophia-Antipo, France, vol. 3-R2, No. V670, Dec. 2005, XP014032608.

* cited by examiner

*Primary Examiner* — Jianye Wu
*Assistant Examiner* — Wanda Z Russell
(74) *Attorney, Agent, or Firm* — Sughrue Mion, PLLC

(57) ABSTRACT

A device for controlling the access of user equipments to broadcast MBMS-type services includes i) a detector for determining whether general information, related to a MBMS service and broadcast by the radio access network, contains configuration information for a MICH-type, notification transport channel dedicated to the MBMS service and ii) a controller for either forcing the user equipment to periodically monitor a MCCH-type logical channel which carries control information related to the service, in the event that the configuration information for the MICH channel is not determined, in order to retrieve information necessary for accessing the MBMS service; or at least suggesting that the user equipment monitor the MICH channel in the event that its configuration information is determined, in order to retrieve update information for the MCCH channel making it possible to monitor the MCCH channel, so as to retrieve the information necessary for accessing the MBMS service.

6 Claims, 1 Drawing Sheet

Figure 1:
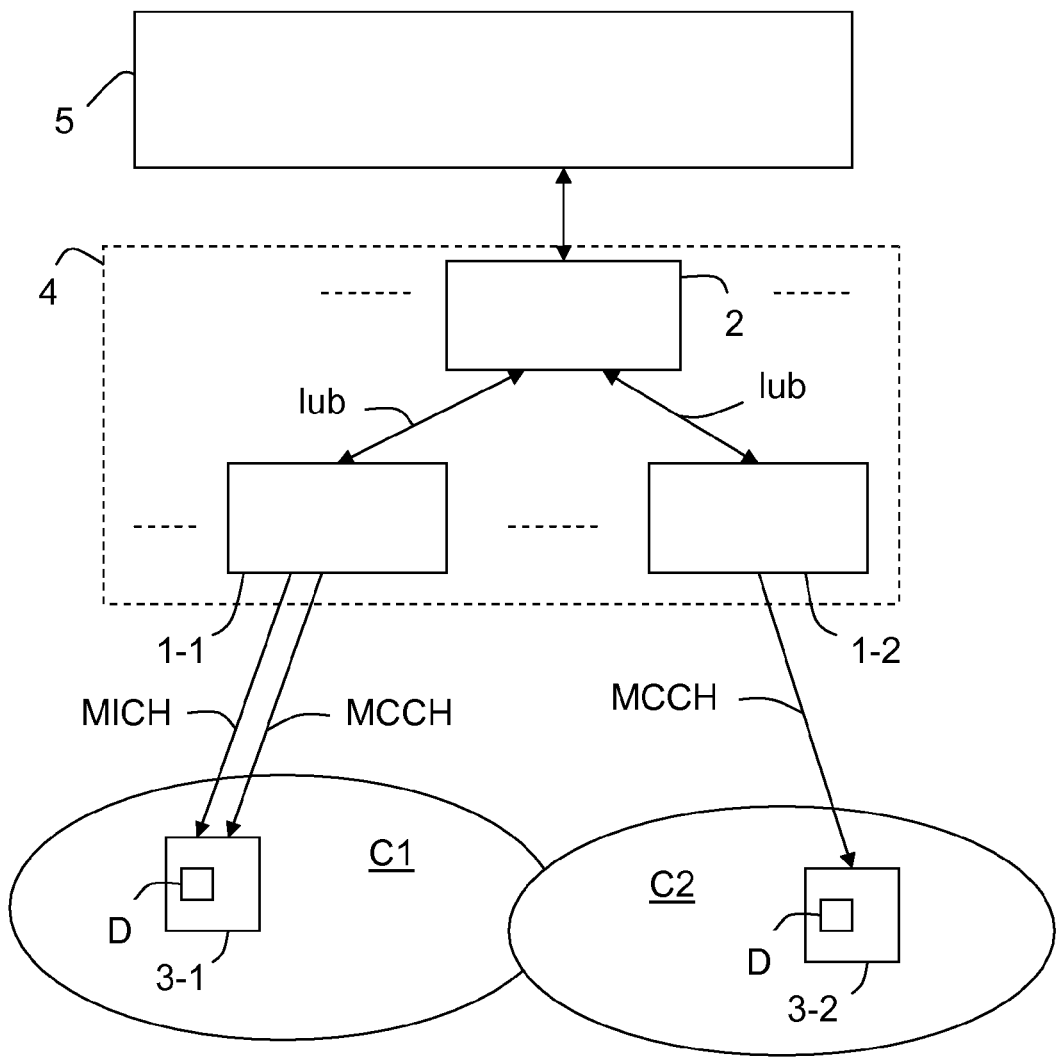

DEVICE AND METHOD FOR CONTROLLING USER EQUIPMENT ACCESS TO SERVICES OF THE MBMS TYPE OFFERED BY A MOBILE NETWORK

The invention pertains to the field of mobile (tele)communication networks, and more precisely user equipment access to broadcast services of the MBMS ("Multimedia Broadcast/Multimedia Service") type.

As is known to a person skilled in the art, in the sixth version of the 3GPP (3rd Generation Partnership Project) specifications governing the transmission of multimedia data within mobile (or cellular) (tele)communication networks which are at least 3G, such as the UMTS or EDGE networks, a unidirectional point-to-multipoint broadcast service (for broadcasting video or audio data, for example), known as MBMS (defined by the 3GPP TS 25.346 technical specifications (which are, in particular, accessible on the 3GPP website at www.3gpp.org)), have been proposed.

Under the 3GPP standard, and more precisely under version #6 of the 3GPP TS 25.331 technical specifications (which are, in particular, accessible on the 3GPP website at www.3gpp.org), two different configurations may enable a user equipment to access an MBMS service (and therefore join an MBMS session).

In one alternative, the user equipment has a first configuration forcing it to initially monitor (or listen to) a notification transport channel, known as MICH (for "MBMS notification Indicator CHannel"), which must be created and configured for said MBMS service, in order to retrieve information enabling it afterwards to monitor (or listen to) a logical channel transporting control information pertaining to the MBMS service, known as MCCH (for "MBMS point-to-multipoint Control CHannel"), which must also be created and configured for said MBMS service. Once the information has been retrieved from the MCCH channel, the user equipment is then capable, should the user request it, of accessing the MBMS service in question.

In the other alternative, the user equipment has a second configuration forcing it to periodically monitor (or listen to) the MCCH channel in order to retrieve the control information that it transports and which pertains to the MBMS service, so that it can access this MBMS service, should the user request it. In such a case, the MICH channel must by necessity always be created and configured for the MBMS service.

If a base station (known as Node B when speaking of a UMTS network) of the radio access network (known as UTRAN when speaking of a UMTS network) does not support an MBMS service (and more precisely, its control plan), then whenever it receives from a network controller (known as an RNC when speaking of a UMTS network) with which it is coupled MBMS information ("Common Transport Channel Set-up" (NBAP 3GPP TS 25.433)) intended for creating and configuring an MICH channel, it must send to said network controller a message refusing the creation of said MICH channel. Consequently, the user equipments which have the first configuration and which are connected to that base station can not access the MBMS service. Some network resources dedicated to the MBMS service are then needlessly wasted, the user equipments that are connected to a base station which does not support the MICH channel needlessly waste time searching for MICH channel information which cannot be sent, and the MBMS service is not accessible within the cell controlled by this base station.

If the base stations and RNC controllers all support MICH channels, and not all user equipments do, then some network resources dedicated to the MBMS service are needlessly wasted.

Furthermore, the RRC ("Radio Resource Control") protocol, which, in particular, handles the establishment of MICH and MCCH channels, and which is defined in version #6 of the 3GPP TS 25.331 technical specifications, requires that an MCCH channel be used to transmit information defining the configuration of the associated MICH channel. Consequently, whenever a base station cannot support an MBMS service's control plan, the user equipments with the second configuration which are connected to it needlessly waste internal resources for processing said information. In such a situation, a network operator generally does not deploy the MBMS service.

The purpose of the invention is therefore to improve the situation.

To that end, it proposes a device dedicated to controlling user equipment access to broadcast services of the MBMS type in a mobile (tele)communication network comprising a radio access network.

This access control device is characterized in that it comprises:
  detection means tasked with determining whether general information related to a service of the MBMS type and being broadcast by the radio access network contains configuration information (or non-configuration information, which amounts to the same thing) for a notification transport channel of the MICH type dedicated to said service of the MBMS type, and
  control means tasked with:
    either forcing the user equipment to periodically monitor a logical channel of the MCCH type which carries control information related to the service of the MBMS type, in the event that the channel of the MICH type configuration information is not determined, in order to retrieve information necessary for accessing the service of the MBMS type,
    or to at least suggest that the user equipment monitor the channel of the MICH type in the event that its configuration information is determined, in order to retrieve update information for the channel of the MCCH type making it possible to monitor said channel, in order to retrieve the information necessary for accessing the service of the MBMS type.

The detection means may, for example, be tasked with detecting configuration (or non-configuration) information of the channel of the MICH type whenever their user equipment is placed in a state chosen from among at least the idle state, the state known as "URA_PCH", the state known as "CELL_PCH", and the state known as "CELL_FACH".

The invention also discloses a user equipment for a mobile (tele)communication network comprising a radio access network and offering broadcast services of the MBMS type, equipped with an access control device of the same type as the one described hereinabove.

The invention also discloses a method dedicated to controlling the access of user equipments to broadcast services of the MBMS type in a (tele)communication network having a radio access network.

This method is characterized in that, for information related to a service of the MBMS type to be transmitted to base stations of a radio access network, it comprises the steps of:

i) determining every base station that does not support the establishment of a notification transport channel of the MICH type dedicated to the service of the MBMS type, then ii) transmitting information related to the configuration of the channel of the MICH type only to each base station which supports the establishment of such a channel of the MICH type, and transmitting general information related to the service of the MBMS type to the user equipments, iii) determining, by means of a user equipment, whether the transmitted general information contains configuration information for the channel of the MICH type, and iv) either forcing the user equipment to periodically monitor a logical channel, of the MCCH type, which carries control information related to the service of the MBMS type, in the event that configuration information for the channel of the MICH type is not determined, so that it may retrieve from it information necessary for accessing the service of the MBMS type, or to at least suggest that the user equipment monitor the channel of the MICH type if its configuration information is determined, so that it may retrieve from it update information for the channel of the MCCH type making it possible to monitor said channel, in order to retrieve from it the information necessary for accessing the service of the MBMS type.

During step iii), the user equipment may proceed to detect configuration (or non-configuration) information for a channel of the MICH type whenever it is placed in a state chosen from among at least the idle state, the URA_PCH state, the CELL_PCH state, and the CELL_FACH state.

Furthermore, during step ii), information may be broadcast by means of a radio resource control protocol, such as the one known as RRC.

The invention is particularly well suited, though not exclusively so, to third-generation (3G) mobile (tele)communication networks, such as UMTS networks. However, the invention generally applies in any situation wherein a notification channel is managed by a base station while a node (UTRAN, radio network controller, or access gateway) manages the user MBMS plan. Consequently, the invention also pertains to certain 2G networks, such as GSM networks, or evolutions of UMTS, such as the one known as LTE.

Figure 2:
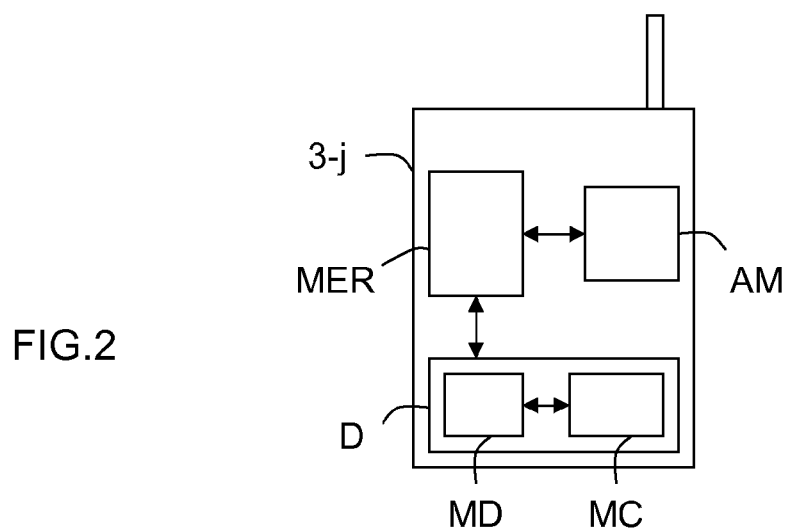

Other characteristics and advantages of the invention will become apparent upon reading the detailed description below, and the attached drawings, in which:

FIG. 1 schematically depicts the general architecture of a radio access network (UTRAN) of a UMTS mobile (tele)communication network, and user equipments connected to the radio access network and equipped with an access control device according to the invention, FIG. 2 schematically and functionally depicts an example embodiment of an access control device according to the invention, embedded in a mobile telephone user equipment.

The attached drawings may serve not only to complete the invention, but may also contribute to defining it, as the case may be.

The invention is intended to enable user equipments to access ("Multimedia Broadcast/Multimedia Service") broadcast services of the MBMS type whenever they are connected to base stations, in a radio access network of a mobile (tele)communication network, which support or do not support at least one part of the control plan of said broadcast services of the MBMS type, and particularly the setup of a channel of the MICH type.

In what follows, by way of a non-limiting example, it shall be assumed that the (tele)communication network is a network of the UMTS type (for "Universal Mobile Telecommunication System") and that it offers broadcast services of the MBMS type (hereafter known as MBMS services).

However, the invention is not limited to this type of mobile network. Rather, it pertains to any mobile network, of at least the second generation (2G), which is capable of making services of the MBMS type available to client user equipments, which may potentially be mobile equipments.

We begin by referring to FIG. 1, in order to describe, in a very schematic fashion, but nevertheless one which is sufficient for understanding the invention, an example mobile ((tele)communication) network in which the invention may be implemented.

The mobile network comprises base stations $1\text{-}i$, known as "Node B" when speaking of UMTS, radio network controllers (or base station controllers) 2, known as "RNC" (for "radio network controller") when speaking of UMTS, and user equipments $3\text{-}j$, some of which being mobile user equipments, known as "user equipment" when speaking of UMTS. The assembly 4, comprising base stations $1\text{-}i$ and network controllers 2, forms the radio access network, known as a UTRAN (for "UMTS Terrestrial Radio Access Network") when speaking of UMTS. The UTRAN is connected to a core network 5.

In the non-limiting example depicted in FIG. 1, only two base stations 1-1 and 1-2 ($i=1$ or $2$), a controller 2, and two user equipments 3-1 and 3-2 ($j=1$ or $2$) have been depicted. However, the variables $i$ and $j$ may assume any value greater than or equal to one (1), and the number of controllers 2 may be greater than one (1).

The user equipments $3\text{-}j$ are communication terminals capable of exchanging data by means of waves, particularly service data and control data, with the mobile (or cellular) network. For example, they may be mobile terminals such as mobile telephones. In what follows, it is assumed, by way of an illustrative and non-limiting example, that user equipments $3\text{-}j$ are mobile telephones.

The controllers 2 are in charge of controlling the radio network and the actions performed by the various user equipments $3\text{-}j$, while the base stations 1 are primarily transmitters/receivers each associated with at least one coverage area (or cell) C1 wherein radio communications may be established with user equipments $3\text{-}j$.

As indicated above, the invention proposes to make services (of the MBMS type) accessible to user equipments $3\text{-}j$, which are respectively connected to base stations $1\text{-}i$ that support or do not support these MBMS services.

To that end, the invention firstly proposes to make the creation (and therefore the configuration) of the notification transport channel of the MICH ("MBMS point-to-multipoint Control CHannel") type optional in the RRC protocol (TS 25.331). As a reminder, the channel of the MICH type is dedicated to the MBMS service in accordance with the 3GPP standard, and more precisely in accordance with version #6 of the 3GPP TS 25.346 technical specifications (Technical Specification Group Radio Access Network—Physical layer—Measurements (FDD)), which are, in particular, accessible on the website of the 3GPP at www.3gpp.org.

In accordance with the current 3GPP standard, the channel of the MICH type must be established between each base station $1\text{-}i$ and the mobile telephones $3\text{-}j$ which are connected to said base station. It is tasked with carrying, in point-to-multipoint mode, notification indicators that indicate an update of a logical channel known as MCCH ("MBMS point-to-multipoint Control CHannel"), subsequent to modifications made to said MCCH channel, such as for instance the beginning of an MBMS session. The MCCH channel must be established between each RNC controller 2 and the mobile telephones 3-*j* which are connected to it. It is tasked with carrying, in point-to-multipoint mode, control information related to the MBMS service in question.

More precisely, whenever an MBMS service must be made available to mobile telephones 3-*j*, the core network 5 conventionally transmits general information related to that MBMS service (known, under the 3GPP standard, as "MBMS GENERAL INFORMATION") to the controllers 2 of the UTRAN, using the RRC protocol ("Radio Resource Control"—defined by TS 25.331 version #6). This general information comprises configuration information for the MBMS service, and configuration information for both the MICH channel and MCCH logical channel.

Whenever a controller 2 receives general information related to an MBMS service, it determines whether at least one of the base stations 1-*i* that it controls does not support at least one part of the MBMS service's control plan, and particularly the establishment of an MICH channel. To do so, it may, for example, refer to configuration data known as O&M ("Operating and Management"). It may also attempt to configure an MICH channel at a base station 1-*i* which it controls using a message known as "NBAP Common Transport Channel Set UP", with the base station 1-*i* responding to this message by indicating whether configuration succeeded or failed.

If at least one base station 1-*i* (for example, 1-2) does not support the establishment of an MICH channel, the controller 2 which controls it decides to not create an MICH channel between this base station 1-2 and the mobile telephones which are connected to it (as depicted in FIG. 1).

In such a case, the controller 2 transmits the MICH channel configuration information that it received only to each base station 1-*i* that it controls and that supports the MBMS service control plan (and therefore the establishment of a channel of the MICH type), using the RRC protocol, whereas it transmits the MBMS general information to the mobile telephones 3-*j* which are connected to it (via said base stations 1-*i*).

Upon receiving the information, every base station 1-*i* that supports the control plan of the corresponding MBMS service creates an MICH channel. In parallel, the controller 2 creates (and configures) the MCCH channel towards the mobile telephones 3-*j* in accordance with the configuration information contained within the general information that it received. This is what is depicted in FIG. 1 for the base station 1-1.

On the other hand, whenever a base station 1-*i* does not support the establishment of a channel of the MICH type, only the MCCH channel is created (and configured) between its controller 2 and the mobile telephones 3-*j* that are connected to it. The base station is therefore no longer obligated to send its controller 2 a message refusing the creation of a MICH channel. This is what is depicted in FIG. 1 for the base station 1-2.

The invention further proposes to equip at least some of the mobile telephones 3-*j* with an access control device D.

As depicted in FIG. 2, by way of an illustrative and non-limiting example, an access control device D of the invention comprises a detection module DM and a control module CM.

The detection module DM may, for example, be coupled to the transmit/receive module TRM of the mobile telephone 3-*j* in order to analyze the general information (related to the MBMS services) that it receives. More precisely, the detection module DM is tasked with determining whether the received general information contains configuration information for an MICH channel dedicated to an MBMS service. To do so, the detection module first analyzes the received system information, which indicates whether an MCCH channel has been created and configured. Next, it analyzes the general information carried by the MCCH channel (over the MICH channel, it learns whether the MCCH channel has been updated for an MBMS service). In this manner, every time the transmit/receive module TRM receives general information, the detection module DM indicates to the control module CM whether this information includes configuration information for an MICH channel of an MBMS service.

Preferentially, the detection module DM proceeds to detect configuration information for MICH channels whenever its mobile telephone 3-*j* is in its idle state, or in one of the states known, under the standard, as "URA_PCH", "CELL_PCH", and "CELL_FACH". As a reminder, the CELL_FACH state corresponds to a situation wherein the dedicated control channel, known as DCCH, and potentially the dedicated traffic channel, known as DTCH (if it has been configured) is (or are) available for the mobile telephone 3-*j*. The URA_PCH and CELL_PCH states correspond to a situation wherein none of the DCCH and DTCH channels are available for the mobile telephone 3-*j*. The CELL_FACH, URA_PCH and CELL_PCH states are, in particular, described in detail in the 3GPP TS 25.331 technical specifications (version #6).

Whenever the control module CM is notified by the detection module DM of the absence of configuration information for an MICH channel of an MBMS service, it forces its mobile telephone 3-*j* (for example, its transmit/receive module TRM) to periodically monitor the MCCH channel of this MBMS service, so that it may retrieve, from among the information carried by the MCCH channel, the information needed for an internal multimedia application MA comprised therein in order to access the MBMS service, should its user request this.

Whenever the control module CM is notified by the detection module DM of the presence of configuration information for an MICH channel of an MBMS service, it is beneficial (for performance reasons) to force its mobile telephone 3-*j* (for example, its transmit/receive module TRM) to monitor this MICH channel, so that it may retrieve the information that will then enable it to monitor the associated MCCH channel in order to retrieve, from among the information transported by the MCCH channel, the information needed for the internal multimedia application MA in order to access the MBMS service, should its user request this. Consequently, the control module CM may either suggest that its mobile telephone 3-*j* monitor the MICH channel, or force its mobile telephone 3-*j* to monitor the MICH channel.

The invention therefore proposes that the user equipments self-adapt to the conditions imposed by the mobile network to which they are connected. Thus, a user equipment may access an MBMS service offered by the mobile network to which it is connected, even if the base station which ensures this connectivity does not support the control plan of this MBMS service. This is particularly advantageous, as it enables the operator of a mobile network to make MBMS services available to all of its clients, even though at least one of the base stations of its mobile network does not support the control plan of at least one of the MBMS services. This situation is particularly encountered when the radio access network of the mobile network includes an open Iu-B interface. Additionally, the invention makes it possible to use 3GPP R99 (version 99) Node B base stations with radio network controllers (RNCs) which support MBMS services.

The access control device D according to the invention, and in particular its detection module DM and control module CM, may be implemented in the form of electronic circuits, software (or computing) modules, or a combination of circuits and software.

The invention is not limited to the embodiments of the access control device and user equipment described above, which are only given as an example; rather, it encompasses all variants that a person skilled in the art may envision within the framework of the claims below.

The invention claimed is:

1. A device for controlling the access of a user equipment to MBMS broadcast services in a mobile (tele)communication network comprising a radio access network, the device comprising:
   i) detection means for determining whether general information, related to a MBMS service and broadcast by said radio access network, contains configuration information relating to the configuration of a MICH notification transport channel dedicated to said MBMS service, and
   ii) control means responsive to a failure to detect said configuration information in said general information, for forcing said user equipment to periodically monitor a MCCH logical channel which carries control information related to said MBMS service in order to retrieve information necessary for accessing said MBMS service; and responsive to a detection that said general information includes said configuration information for suggesting to said user equipment to monitor said MICH channel in order to retrieve update information for said MCCH channel making it possible to monitor said channel, so as to retrieve said information necessary for accessing said MBMS service.

2. A device according to claim 1, wherein said detection means are designed to proceed to detect configuration information for a MICH channel whenever said user device is placed in a state chosen from among a group comprising at least an idle state, a state known as "URA_PCH", a state known as "CELL_PCH", and a state known as "CELL_FACH".

3. A user equipment for a mobile (tele)communication network comprising a radio access network and offering MBMS broadcast services, said user equipment comprising an access control device according to claim 1.

4. A method for controlling the access of user equipments to MBMS broadcast services in a (tele)communication network comprising a radio access network, said method comprising, for information related to a MBMS service to be transmitted to base stations (1-i) of said radio access network, the steps of
   i) determining every base station that does not support the establishment of a MICH notification transport channel dedicated to the MBMS service,
   ii) transmitting configuration information related to the configuration of the MICH channel only to every base station which supports the establishment of such a MICH channel, and transmitting general information related to said MBMS service to user equipments,
   iii) determining, by means of a user equipment, whether said transmitted general information contains said configuration information channel, and
   iv) either forcing said user equipment to periodically monitor a MCCH logical channel which carries control information related to said MBMS service, when said configuration information is not determined to be contained in said transmitted general information, so that said user equipment may retrieve information necessary for accessing said MBMS service or suggesting that said user equipment monitor said MICH channel if said configuration information is determined to be included in said transmitted general information, so that said user equipment may retrieve update information for said MCCH channel making it possible to monitor said MCCH channel, in order to retrieve said information necessary for accessing said MBMS service.

5. A method according to claim 4, wherein during step iii), said user equipment proceeds to detect configuration information for a MICH channel whenever said user equipment is placed in a state chosen from among a group comprising at least an idle state, a state known as "URA_PCH", a state known as "CELL_PCH", and a state known as "CELL_FACH".

6. A method according to claim 4, wherein during step ii), said configuration information is broadcast by means of a radio resource control (RRC) protocol.

* * * * *